(12) United States Patent
Johnson et al.

(10) Patent No.: US 8,078,340 B2
(45) Date of Patent: Dec. 13, 2011

(54) ACTIVE USER INTERFACE HAPTIC FEEDBACK AND LINKING CONTROL SYSTEM USING EITHER FORCE OR POSITION DATA

(75) Inventors: Andrew T. Johnson, Scottsdale, AZ (US); Casey Hanlon, Queen Creek, AZ (US)

(73) Assignee: Honeywell International Inc., Morristown, NJ (US)

( * ) Notice: Subject to any disclaimer, the term of this patent is extended or adjusted under 35 U.S.C. 154(b) by 1065 days.

(21) Appl. No.: 11/938,581

(22) Filed: Nov. 12, 2007

(65) Prior Publication Data

US 2009/0125166 A1  May 14, 2009

(51) Int. Cl.
  *G05B 23/00* (2006.01)
  *B64C 13/46* (2006.01)
(52) U.S. Cl. .............. 701/3; 244/223; 318/564
(58) Field of Classification Search ............ 244/148, 244/229, 223, 237, 99.2
  See application file for complete search history.

(56) References Cited

U.S. PATENT DOCUMENTS

| 5,264,768 | A  | * | 11/1993 | Gregory et al. ........... 318/561 |
| 5,291,113 | A  | * | 3/1994  | Hegg et al. .............. 318/584 |
| 5,456,428 | A  | * | 10/1995 | Hegg ...................... 244/229 |
| 5,489,830 | A  | * | 2/1996  | Fernandez ................ 318/628 |
| 5,694,014 | A  | * | 12/1997 | Hegg et al. .............. 318/564 |
| 6,000,662 | A  | * | 12/1999 | Todeschi et al. ........... 244/223 |
| 6,128,554 | A  | * | 10/2000 | Damotte ................... 701/4 |
| 6,459,228 | B1 | * | 10/2002 | Szulyk et al. ............. 318/632 |
| 7,108,232 | B2 | * | 9/2006  | Hoh ....................... 244/223 |
| 7,648,106 | B2 | * | 1/2010  | Granier et al. ............ 244/223 |
| 7,658,349 | B2 | * | 2/2010  | Abel et al. ............... 244/223 |
| 7,878,461 | B2 | * | 2/2011  | Hirvonen et al. .......... 244/223 |
| 2007/0135594 | A1 | * | 6/2007 | Voskoboynikov et al. ... 526/127 |
| 2008/0142642 | A1 | * | 6/2008 | Marino et al. ............ 244/223 |
| 2008/0156939 | A1 | * | 7/2008 | Hanlon et al. ............ 244/223 |

* cited by examiner

*Primary Examiner* — Thomas Black
*Assistant Examiner* — Lin B Olsen
(74) *Attorney, Agent, or Firm* — Ingrassia Fisher & Lorenz, P.C.

(57) ABSTRACT

A system and method are provided for supplying haptic feedback to, and for electronically linking, pilot and co-pilot user interfaces. The user interface haptic feedback and linking are implemented using either force or position data. If the force or position data become unavailable, then position or force data, respectively, are used to implement the user interface haptic feedback and linking.

16 Claims, 3 Drawing Sheets

ACTIVE USER INTERFACE HAPTIC FEEDBACK AND LINKING CONTROL SYSTEM USING EITHER FORCE OR POSITION DATA

TECHNICAL FIELD

The present invention generally relates to active user interfaces and, more particularly to a user interface system that implements user interface haptic feedback and linking via force or position data.

BACKGROUND

Aircraft may be broadly classified into fixed wing and rotating wing types. Fixed wing aircraft typically include a plurality of flight control surfaces that, when controllably positioned, guide the movement of the aircraft from one destination to another. The number and type of flight control surfaces included in an aircraft may vary, but typically include both primary flight control surfaces and secondary flight control surfaces. The primary flight control surfaces are those that are used to control aircraft movement in the pitch, yaw, and roll axes, and the secondary flight control surfaces are those that are used to influence the lift or drag (or both) of the aircraft. Although some aircraft may include additional control surfaces, the primary flight control surfaces typically include a pair of elevators, a rudder, and a pair of ailerons, and the secondary flight control surfaces typically include a plurality of flaps, slats, and spoilers. Rotating wing aircraft typically do not have flight control surfaces that are separate from the airfoils that produce lift, but the airfoils that constitute the rotating wing have a cyclic control for pitch and roll, and a collective control for lift.

The positions of the aircraft flight control surfaces are typically controlled using a flight control surface actuation system. The flight control surface actuation system, in response to position commands that originate from either the flight crew or an aircraft autopilot, moves the aircraft flight control surfaces to the commanded positions. In most instances, this movement is effected via actuators that are coupled to the flight control surfaces. Typically, the position commands that originate from the flight crew are supplied via one or more user interfaces. For example, many aircraft include duplicate mechanical interfaces, such as yokes and pedals, one set each for the pilot and for the co-pilot. Either of the mechanical pilot or co-pilot user interfaces can be used to generate desired flight control surface position commands.

Recently, the mechanical user interfaces are being replaced with active fly-by-wire user interfaces in many aircraft. Similar to the traditional mechanical user interfaces, it is common to include multiple active user interfaces in the cockpit, one for the pilot and one for the co-pilot. In some implementations, one or more orthogonally arranged springs are used to provide a passive centering force to the fly-by-wire user interfaces. In other implementations, one or more electric motors supply force feedback (or "haptic feedback") to the user, be it the pilot or the co-pilot. These latter implementations are generally referred to as active user interface haptic feedback systems.

No matter the specific type of user interfaces that are used, it is desirable in active user interface haptic feedback systems that the pilot and co-pilot user interfaces be linked. That is, that the movements of the corresponding pilot and co-pilot user interfaces track each other. This, among other things, assures that only a single set of position commands is supplied to the flight control surface actuation system, and that the pilot and co-pilot feel each other's influence on their respective user interfaces.

Most active user interface haptic feedback systems implement pilot and co-pilot linking using force information supplied from force sensors associated with the pilot and co-pilot user interfaces. The force sensors that are typically used are relatively high-fidelity force sensors, which increase overall system cost and complexity. Moreover, when redundancy is employed to increase overall system reliability, the increased cost and complexity can be significant.

Hence, there is a need for an active user interface haptic feedback system for aircraft that provides pilot and co-pilot linking and that exhibits suitable fidelity and/or redundancy, without significantly impacting overall system cost and complexity. The present invention addresses at least this need.

BRIEF SUMMARY

In one embodiment, and by way of example only, an active user interface control system includes a pilot user interface, a pilot user interface force sensor, a pilot user interface position sensor, a pilot user interface motor, and a pilot user interface motor control. The pilot user interface is configured to receive an input force and, upon receipt of the input force, to move to a control position. The pilot user interface force sensor is configured to sense the input force supplied to the pilot user interface and is operable to supply a pilot user interface force signal representative thereof. The pilot user interface position sensor is operable to supply a pilot user interface position signal representative of the pilot user interface. The pilot user interface motor is coupled to the pilot user interface, is further coupled to receive motor current, and is operable, upon receipt of the motor current, to supply a pilot user interface feedback force to the pilot user interface. The pilot user interface motor control is coupled to receive the pilot user interface force signal and the pilot user interface position signal and is operable to selectively control motor current to the pilot user interface motor based on either the pilot user interface force signal or the pilot user interface position signal.

In another exemplary embodiment, an active user interface control system includes a pilot user interface, a co-pilot user interface, a pilot user interface force sensor, a co-pilot user interface force sensor, a pilot user interface position sensor, a co-pilot user interface position sensor, a pilot user interface motor, and a pilot user interface motor control. The pilot user interface is configured to receive an input force and, upon receipt thereof, to move to a pilot user interface control position. The co-pilot user interface is configured to receive an input force and, upon receipt thereof, to move to a co-pilot user interface control position. The pilot user interface force sensor is configured to sense the input force supplied to the pilot user interface and is operable to supply a pilot user interface force signal representative thereof. The co-pilot user interface force sensor is configured to sense the input force supplied to the co-pilot user interface and is operable to supply a co-pilot user interface force signal representative thereof. The pilot user interface position sensor is operable to supply a pilot user interface position signal representative of the pilot user interface position. The co-pilot user interface position sensor is operable to supply a co-pilot user interface position signal representative co-pilot user interface position. The pilot user interface motor is coupled to the pilot user interface, is further coupled to receive motor current, and is operable, upon receipt thereof, to supply a pilot user interface feedback force to the pilot user interface. The pilot user interface motor control is coupled to receive the pilot user interface and co-pilot user interface force signals and the pilot user interface and co-pilot user interface position signals and is operable to selectively control motor current to the pilot user interface motor based on one of: (i) the pilot user interface force signal and the co-pilot user interface force signal, (ii) the pilot user interface force signal and the co-pilot user interface position signal, (iii) the pilot user interface position signal and the co-pilot user interface force signal, or (iv) the pilot user interface position signal and the co-pilot user interface position signal.

In yet another exemplary embodiment, a method of electronically linking a pilot user interface and a co-pilot user interface includes the steps of determining pilot input force supplied to the co-pilot user interface, determining pilot user interface position, determining co-pilot input force supplied to the co-pilot user interface, and determining co-pilot user interface position. Haptic feedback is selectively supplied to the pilot user interface based at least on either the determined co-pilot user interface input force or the determined co-pilot user interface position, and haptic feedback is selectively supplied to the co-pilot user interface based at least on either the determined pilot user interface input force or the determined pilot user interface position.

Other desirable features and characteristics of the user interface system will become apparent from the subsequent detailed description of the invention and the appended claims, taken in conjunction with the accompanying drawings and this background of the invention.

BRIEF DESCRIPTION OF THE DRAWINGS

The present invention will hereinafter be described in conjunction with the following drawing figures, wherein like numerals denote like elements, and wherein.

DETAILED DESCRIPTION

The following detailed description is merely exemplary in nature and is not intended to limit the invention or the application and uses of the invention. Furthermore, there is no intention to be bound by any theory presented in the preceding background or the following detailed description. In this regard, although much of the invention is depicted and described as being implemented for aircraft primary flight control surfaces of fixed wing aircraft, it will be appreciated that it may also be implemented, for example, for cyclic or collective control of the rotating wing in rotating wing aircraft, for aircraft brakes, for aircraft flight simulators, for refueling booms, and/or nose wheel steering. Moreover, although fixed-wing aircraft are depicted and described herein, the invention may also be used in rotary-wing aircraft.

Figure 1:
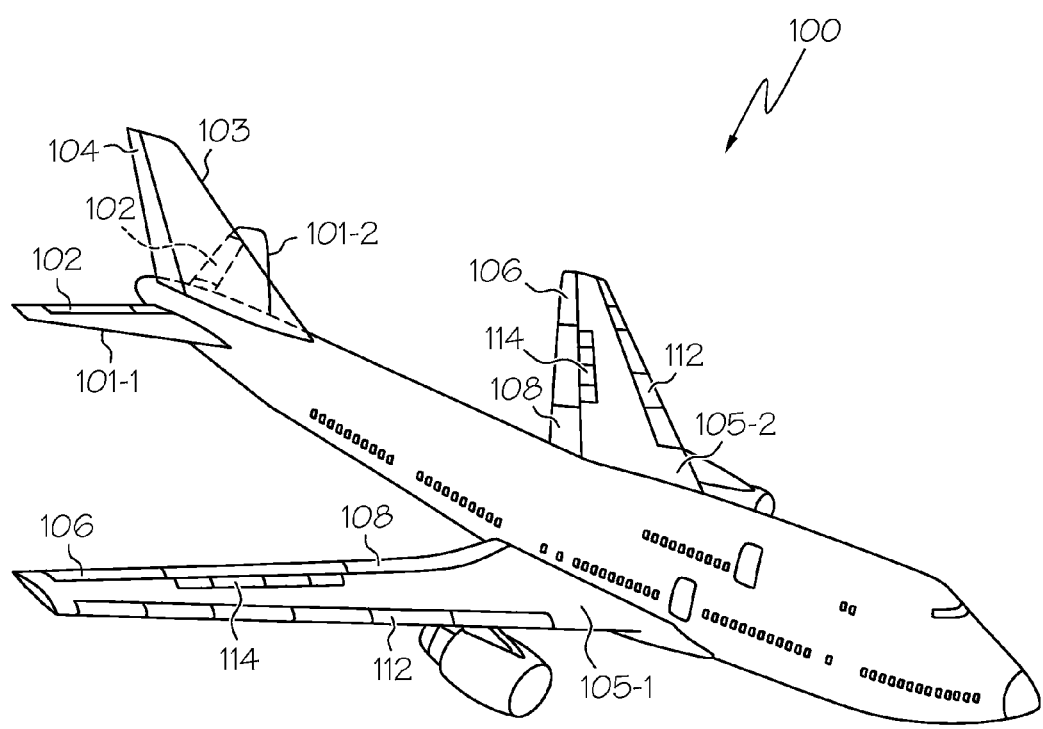
FIG. 1 is a perspective view of an exemplary fixed-wing aircraft depicting primary and secondary flight control surfaces.

Turning now to FIG. 1, a perspective view of an exemplary aircraft is shown. In the illustrated embodiment, the aircraft 100 includes first and second horizontal stabilizers 101-1 and 101-2, respectively, a vertical stabilizer 103, and first and second wings 105-1 and 105-2, respectively. An elevator 102 is disposed on each horizontal stabilizer 101-1, 101-2, a rudder 104 is disposed on the vertical stabilizer 103, and an aileron 106 is disposed on each wing 105-1, 105-2. In addition, a plurality of flaps 108, slats 112, and spoilers 114 are disposed on each wing 105-1, 105-2. The elevators 102, the rudder 104, and the ailerons 106 are typically referred to as the primary flight control surfaces, and the flaps 108, the slats 112, and the spoilers 114 are typically referred to as the secondary flight control surfaces.

The primary flight control surfaces 102-106 control aircraft movements about the aircraft pitch, yaw, and roll axes. Specifically, the elevators 102 are used to control aircraft movement about the pitch axis, the rudder 104 is used to control aircraft movement about the yaw axis, and the ailerons 106 control aircraft movement about the roll axis. It is noted, however, that aircraft movement about the yaw axis can also be achieved by varying the thrust levels from the engines on opposing sides of the aircraft 100.

The secondary control surfaces 108-114 influence the lift and drag of the aircraft 1 00. For example, during aircraft take-off and landing operations, when increased lift is desirable, the flaps 108 and slats 112 may be moved from retracted positions to extended positions. In the extended position, the flaps 108 increase both lift and drag, and enable the aircraft 100 to descend at a lower airspeed, and also enable the aircraft 100 get airborne over a shorter distance. The slats 112, in the extended position, increase lift, and are typically used in conjunction with the flaps 108. The spoilers 114, on the other hand, reduce lift and when moved from retracted positions to extended positions, which is typically done during aircraft landing operations, may be used as air brakes to assist in slowing the aircraft 100.

Figure 2:
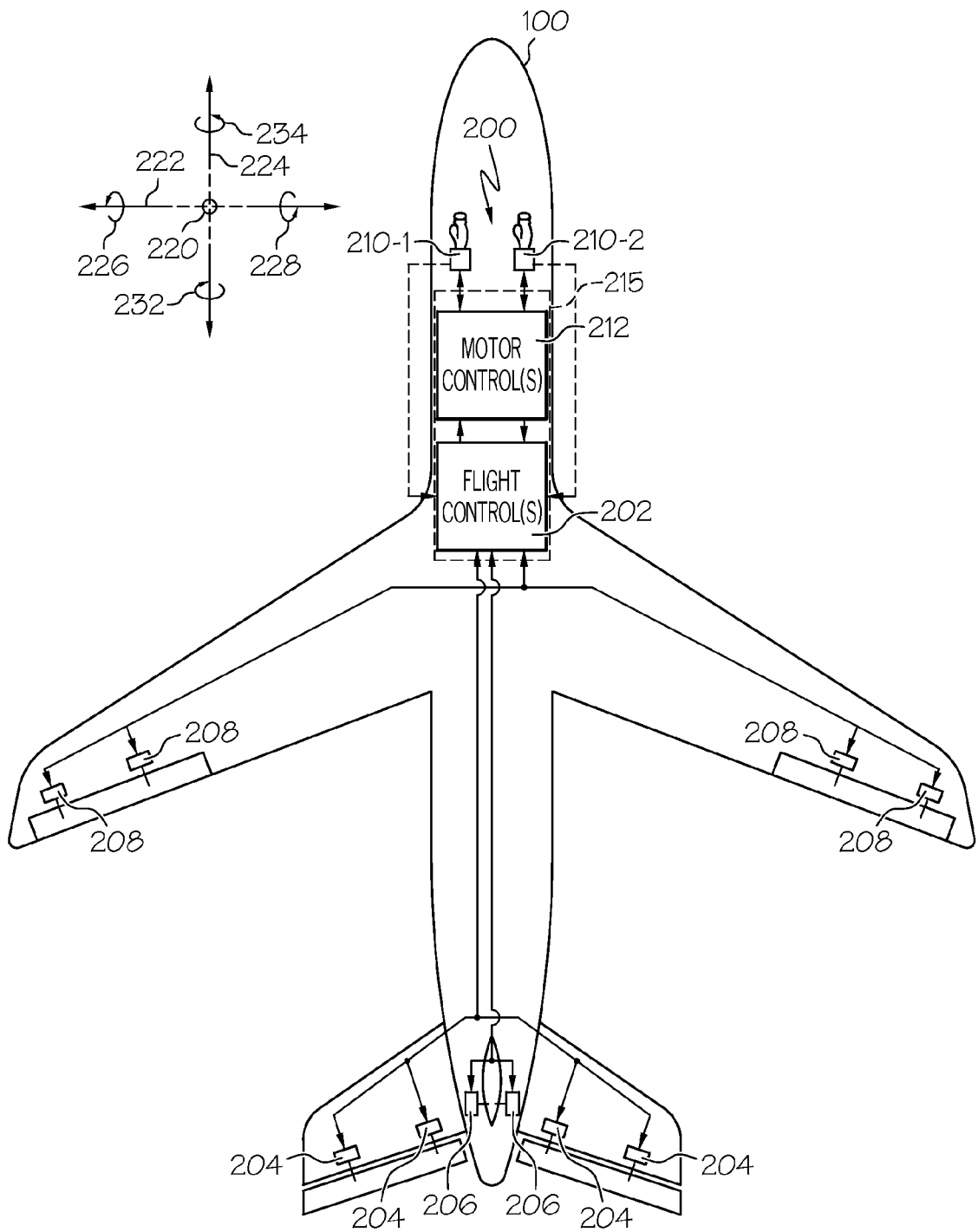
FIG. 2 is a schematic depicting portions of an exemplary flight control surface actuation system according one embodiment of the present invention.

The flight control surfaces 102-114 are moved to commanded positions via a flight control surface actuation system 200, an exemplary embodiment of which is shown in FIG. 2. In the depicted embodiment, the flight control surface actuation system 200 includes flight controls 202, a plurality of primary flight control surface actuators, which include elevator actuators 204, rudder actuators 206, and aileron actuators 208. It will be appreciated that the system 200 may be implemented with a plurality of flight controls 202. However, for ease of description and illustration, only a single, multi-channel control 202 is depicted. It will additionally be appreciated that one or more functions of the flight controls 202 could be implemented using a plurality of devices.

Before proceeding further, it is noted that the flight control surface actuation system 200 additionally includes a plurality of secondary control surface actuators, such as flap actuators, slat actuators, and spoiler actuators. However, the operation of the secondary flight control surfaces 108-114 and the associated actuators is not needed to fully describe and enable the present invention. Thus, for added clarity, ease of description, and ease of illustration, the secondary flight control surfaces and actuators are not depicted in FIG. 2, nor are these devices further described. Moreover, controls for the rudder 104 and non-illustrated aircraft brakes are also not included in FIGS. 2 and 3 for clarity and ease of description. Nonetheless, it will be appreciated that the invention may be applied to rudder and brakes controls in a similar fashion.

Returning now to the description, the flight control surface actuation system 200 may additionally be implemented using various numbers and types of primary flight control surface actuators 204-208. In addition, the number and type of primary flight control surface actuators 204-208 per primary flight control surface 102-106 may be varied. In the depicted embodiment, however, the system 200 is implemented such that two primary flight control surface actuators 204-208 are coupled to each primary flight control surface 102-106. Moreover, each of the primary flight control surface actuators 204-208 are typically a linear-type actuator, such as, for example, a ballscrew actuator or hydraulic cylinder. It will be appreciated that this number and type of primary flight control surface actuators 204-208 are merely exemplary of a particular embodiment, and that other numbers and types of actuators 204-208 could also be used.

No matter the specific number, configuration, and implementation of the primary flight control surface actuators 204-208, the flight controls 202 are configured to receive aircraft flight control surface position commands from one or more input control mechanisms. In the depicted embodiment, the system 200 includes two user interfaces, a pilot user interface 210-1 and a co-pilot user interface 210-2, and one or more motor controls 212. In the depicted embodiment, the pilot 210-1 and co-pilot 210-2 user interfaces are both implemented as active user interfaces. It will be appreciated that in some embodiments the system 200 could be implemented with more or less than this number of user interfaces 210. Moreover, and as was alluded to above, the user interface 210 (or user interfaces) could be implemented as rudder/brake pedals or, if the aircraft is of the rotary-wing type, a cyclic and/or collective.

It will additionally be appreciated that the system could be implemented with more than one motor control 212, and that each flight control 202 and each motor control 212 could be integrated into a single control circuit 215, as depicted in phantom in FIG. 2. Nonetheless, the motor control 212, in response to position and/or force signals supplied from one or both user interfaces 210, supplies flight control surface position signals to the flight control(s) 202. The flight control(s) 202, in response to the flight control surface position signals, supplies power to the appropriate primary flight control surface actuators 204-208, to move the appropriate primary flight control surfaces 102-106 to positions that will cause the aircraft 100 to implement the commanded maneuver. As depicted in phantom in FIG. 2, in other embodiments the system 200 can be configured such that one or more signals from the user interfaces 210, such as the just-mentioned force and/or position signals, are supplied directly to the flight control(s) 202, or are supplied to one or more aircraft data buses for communication to the flight control(s) 202.

Figure 3:
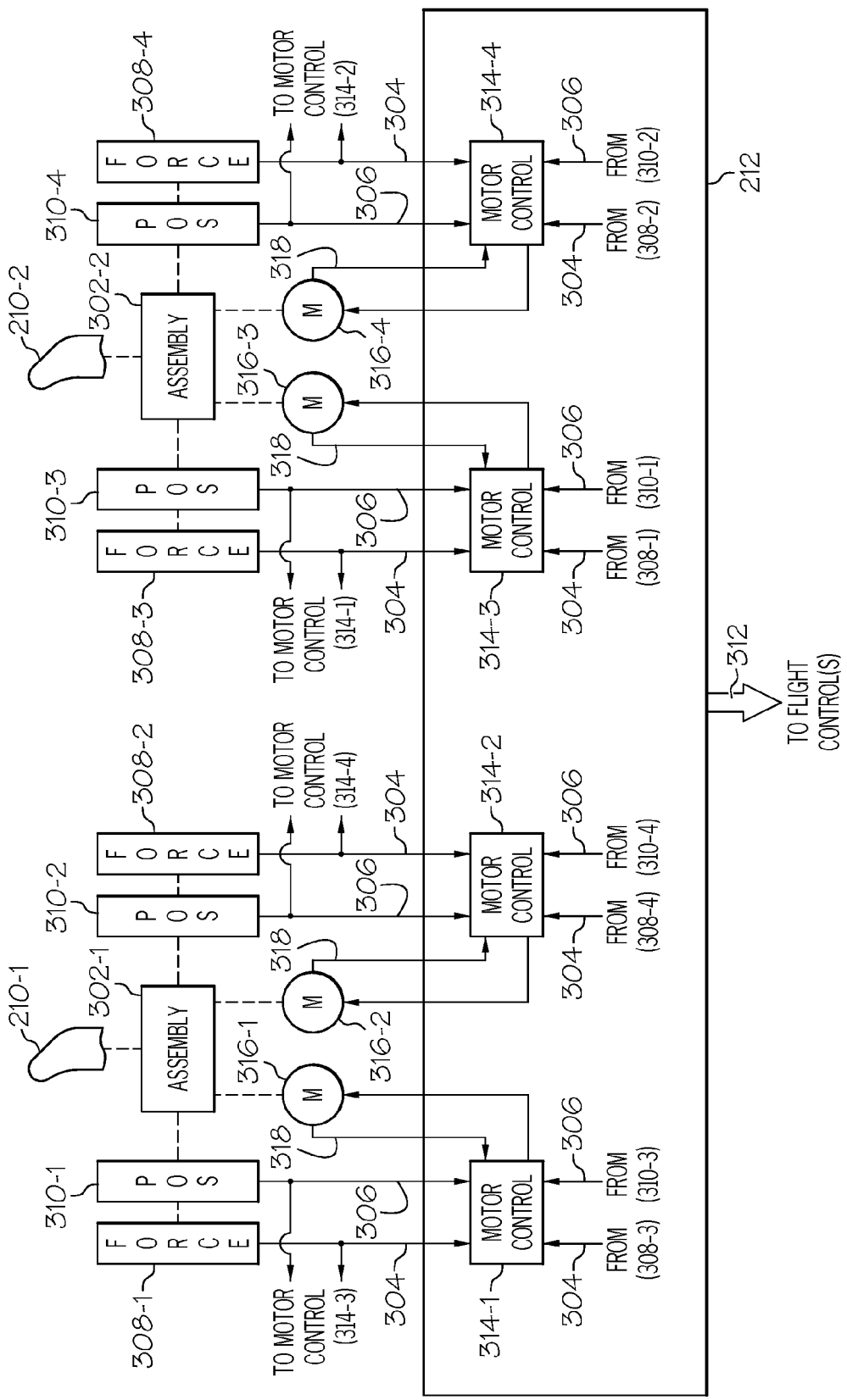
FIG. 3 is a functional block diagram of the flight control surface actuation system of FIG. 2, depicting certain portions thereof in slightly more detail.

Turning now to FIG. 3, which is also a functional block diagram of the flight control surface actuation system 200 depicting portions thereof in slightly more detail, it may be seen that the user interfaces 210 are each coupled to a suitable multiple degree-of-freedom assembly 302 (e.g., 302-1, 302-2), and are each configured to move, in response to input from either a pilot or a co-pilot, to a control position in a first direction or a second direction. Although the configuration of the flight control sticks 210 may vary, in the depicted fixed-wing embodiment, and with quick reference to FIG. 2, each user interface 210 is configured to rotate, from a null position 220 to a control position, about two perpendicular rotational axes, which in the depicted fixed wing embodiment are a pitch axis 222 and a roll axis 224. More specifically, if the pilot or co-pilot moves the flight control stick 210 in a forward direction 226 or an aft direction 228, to thereby control aircraft pitch, the user interface 210 rotates about the pitch axis 222. Similarly, if the pilot or co-pilot moves the user interface 210 in a port direction 232 or a starboard direction 234, to thereby control aircraft roll, the user interface 210 rotates about the roll axis 224. It will additionally be appreciated that the user interface 210 may be moved in a combined forward-port direction, a combined forward-starboard direction, a combined aft-port direction, or a combined aft-starboard direction, and back to or through the null position 220, to thereby implement a combined aircraft pitch and roll maneuver.

Returning once again to FIG. 3, as was noted above, user interface force signals 304 and user interface position signals 306 are supplied from the pilot 210-1 and co-pilot 210-2 user interfaces to the motor control 212, the flight control(s) 202, or both. The user interface force signals 304 are representative of the force applied to the respective user interfaces 210, and are supplied by user interface force sensors 308 that are coupled to each user interface 210. The user interface position signals 306 are representative of the respective user interface positions, and are supplied by user interface position sensors 310. In the depicted embodiment, two user interface force sensors 308 (e.g., 308-1, 302-2) and two user interface position sensors 310 (e.g., 310-1, 310-2) are associated with each user interface 210. It will be appreciated that that number of user interface force 308 and/or position sensors 310 may vary. It will additionally be appreciated that the user interface force 308 and position 310 sensors may be implemented using any one of numerous types of force sensors and/or position sensors. For example, the user interface force sensors 308 may be implemented using strain gage sensors, piezoelectric sensors, semiconductor sensors, or optical sensors, just to name a few, and the user interface position sensors 310 may be implemented using absolute inceptor position sensors such as RVDTs, LVDTs, potentiometers, or optical sensors, just to name a few.

In addition to variations in the type of position sensor 310 that may be used, it will be appreciated that the user interface position sensor 310 may be configured to sense either the position of the user interface 210 or the rotational position of another component to which the user interface 210 is coupled, such as the motor 318. If the user interface position sensor 310 is configured to sense the position of, for example, the motor 318 using sensors such as a resolver or an encoder, to name just a few, then user interface position may be derived by integrating the sensed motor position. One or more additional position sensors (not depicted) may be included if user interface position is derived from motor position to, for example, initialize the motor position integrator. It will be further appreciated that the motor position integrator could also be initialized using a touch stop method.

No matter the specific number and type of user interface force 308 and position 310 sensors, at least one of the user interface force sensors 308-1 (308-2) associated with each user interface 210 is configured to sense a vector component of the input force supplied to the user interface 210 that results in user interface rotation about the pitch axis 222, and another user interface force sensor 308-2 (308-1) associated with each user interface 210 is configured to sense a vector component of the input force supplied to the user interface 210 that results in user interface rotation about the roll axis 224. Similarly, one of the user interface position sensors 310-1 (310-2) associated with each user interface 210 is configured to supply user interface position signals representative of a vector component of the user interface position that lies along the pitch axis 222, and another user interface position sensor 308-2 (308-1) associated with each user interface 210 is configured to supply user interface position signals representative a vector component of the user interface position that lies along the roll axis 224. In any case, the user interface force signals 304 and the user interface position signals 306 are each supplied to the motor control 212.

The motor control 212, at least in some embodiments, upon receipt of the user interface force signals 304 and the user interface position signals 306, supplies flight control surface position commands 312 to the flight control(s) 202, which in turn supplies power to the appropriate primary flight control surface actuators 204-208, to move the appropriate primary flight control surfaces 102-106 to the appropriate positions, to thereby implement a desired maneuver. Alternatively, and as mentioned above and as depicted in phantom in FIG. 3, the flight control(s) 202 may receive the user interface force signals 304 and/or user interface position signals 306 directly from the user interface force sensors 308 and/or user interface position sensors 310 and, in response, supply power to the appropriate primary flight control surface actuators 204-208, to move the appropriate primary flight control surfaces 102-106 to the appropriate positions.

As FIG. 3 additionally shows, the motor control 212, at least in the depicted embodiment, includes a plurality of motor controls 314 (e.g., 314-1, 314-2, 314-3, 314-4). In particular, the motor control 212 includes two pilot user interface motor controls 314-1, 314-2 and two co-pilot user interface motor controls 314-3, 314-4. The pilot user interface motor controls 314-1, 314-2 each control motor current to one of the pilot user interface motors 316-1, 316-2, and the co-pilot user interface motor controls 314-3, 314-4 each control motor current to one of the co-pilot user interface motors 316-3, 316-4. The motors 316, which are each coupled to one of the user interfaces 210, typically via non-illustrated gear sets, are each operable, upon receipt of the motor current, to supply user interface feedback force to the associated user interface 210. More specifically, one of the pilot user interface motors 314-1 (314-2) and one of the co-pilot user interface motors 314-3 (314-4) are each operable, upon receipt of the motor current, to supply a user interface feedback force to its associated pilot 210-1 and co-pilot 210-2 user interface about the first rotational axis. Similarly, the other one of the pilot user interface motors 314-2 (314-1) and the other one of the co-pilot user interface motors 314-4 (314-3) are operable, upon receipt of the motor current, to supply a user interface feedback force to its associated pilot 210-1 and co-pilot 210-2 user interface about the second rotational axis. The user interfaces 210, in response to the user interface feedback force supplied from the associated motors 316, supply haptic feedback to the pilot or co-pilot, as the case may be. Preferably, the motors 316 are each implemented using permanent magnet brushless machines. As such, current feedback and commutation signals 318 associated with each motor 316 are supplied to that motor's associated motor control 314.

The motor controls 314, as was noted above, each control the motor current to one of the motors 316. More specifically, each motor control 314 controls the motor current to its respective motor 316 based, at least in part, on the respective user interface force signals 304 or the respective user interface position signals 306. Moreover, the pilot and co-pilot user interface motors are electrically linked, so that only a single set of commands is supplied to the flight control surface actuation system, and so that the pilot and co-pilot can feel each other's influence on their respective user interfaces 210. As such, the pilot user interface motor controls 314-1, 314-2 additionally control the motor current supplied to the pilot user interface motors 316-1, 316-2 based, at least in part, on the respective co-pilot user interface force signals 304 or the respective co-pilot user interface position signals 304. Similarly, co-pilot user interface motor controls 314-3, 314-4 additionally control the motor current supplied to the co-pilot user interface motors 316-1, 316-2 based, at least in part, on the respective pilot user interface force signals 304 or the respective pilot user interface position signals 306. Before proceeding further, it is noted that although it is not depicted or further described herein, it will additionally be appreciated that each motor control 314 may additionally control the motor current to its respective motor 316 based, at least further in part, on various other parameters including, for example, the slew rate of the user interfaces 210, and various aircraft and control surface conditions.

It was just noted that each motor control 314 controls the motor current to its respective motor 316 based, at least in part, on the pilot and co-pilot user interface force signals 304 supplied thereto or the respective pilot and co-pilot user interface position signals 306 supplied thereto. Preferably, each motor control 314 is configured, during normal system operation, to control the motor current to its respective motor 316 based, at least in part, on the pilot and co-pilot user interface force signals 304 that are supplied thereto. If one or both of the user interface force signals 304 is not received by the motor control 314 due to, for example, one or more failed or otherwise inoperable user interface force sensors 304, then the motor control 314 will continue to control the motor current to its respective motor 316 based, at least in part, the remaining user interface force signal 304 (if only one is not received) and additionally on either or both the pilot and co-pilot user interface position signals 306.

For example, if a pilot user interface motor control 314-1, 314-2 does not receive the pilot user interface force signal 304 only, then that pilot user interface motor control 314-1, 314-2 will continue to control the motor current to its respective pilot user interface motor 316-1, 316-2 based, at least in part, on the co-pilot user interface force signal 304 and additionally on the pilot user interface position signal 306. If, however, a pilot user interface motor control 314-1, 314-2 does not receive both the pilot and co-pilot user interface force signals 304, then that pilot user interface motor control 314-1, 314-2 will control the motor current to its respective pilot user interface motor 316-1, 316-2 based, at least in part, on the pilot and co-pilot user interface position signals 306. Similarly, if a co-pilot user interface motor control 314-3, 314-4 does not receive the co-pilot user interface force signal 304 only, then that co-pilot user interface motor control 314-3, 314-4 will continue to control the motor current to its respective co-pilot user interface motor 316-3, 316-4 based, at least in part, on the pilot user interface force signal 304 and additionally on the co-pilot user interface position signal 306. If, however, a co-pilot user interface motor control 314-3, 314-4 does not receive both the pilot and co-pilot user interface force signals 304, then that co-pilot user interface motor control 314-3, 314-4 will control the motor current to its respective co-pilot user interface motor 316-3, 316-4 based, at least in part, on the pilot and co-pilot user interface position signals 306.

In an alternative embodiment, each motor control 314 is configured, during normal system operation, to control the motor current to its respective motor 316 based, at least in part, on the pilot and co-pilot user interface position signals 306 that are supplied thereto, rather than on the pilot and co-pilot user interface force signals 304. This embodiment functions much like the above-described embodiment, in that if one or both of the user interface position signals 306 is not received by a motor control 314 due to, for example, one or more failed or otherwise inoperable user interface position sensors 310, then the affected motor control(s) 314 will continue to control the motor current to the respective motor(s) 316 based, at least in part, the remaining user interface position signal 306 (if only one is not received) and additionally on either or both the pilot and co-pilot user interface force signals 304.

The haptic feedback systems and methods described herein electronically implement, among other things, linking of pilot and co-pilot user interfaces. In some embodiments, linking is implemented using both force and position data, so that the unavailability of all or portions of either of these data is accommodated passively. In other embodiments, linking is implemented using either force or position data, and if the force or position data become unavailable then position or force data, respectively, are used.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. An active user interface control system, comprising:
    a pilot user interface configured to rotate, from a null position, about a first rotational axis and a second rotational axis, the second rotational axis perpendicular to the first rotational axis, the pilot user interface further configured to receive an input force and, upon receipt of the input force, to rotate, about one or both of the first and second rotational axes, from the null position to a control position;
    a first pilot user interface force sensor configured to sense a vector component of the input force supplied to the pilot user interface that results in pilot user interface rotation about the first rotational axis and operable to supply a first pilot user interface force signal representative thereof;
    a second pilot user interface force sensor configured to sense a vector component of the input force supplied to the pilot user interface that results in pilot user interface user interface rotation about the second rotational axis and operable to supply a second pilot user interface force signal representative thereof;
    a first pilot user interface position sensor operable to supply a first pilot user interface position signal representative of a vector component of the control position that lies along the second rotational axis;
    a second pilot user interface position sensor operable to supply a second pilot user interface position signal representative of a vector component of the control position that lies along the first rotational axis;
    a first pilot user interface motor coupled to the pilot user interface, the first pilot user interface motor further coupled to receive motor current and operable, upon receipt of the motor current, to supply a first pilot user interface feedback force to the pilot user interface about the first rotational axis;
    a second pilot user interface motor coupled to the pilot user interface, the second pilot user interface motor further coupled to receive motor current and operable, upon receipt thereof, to supply a second pilot user interface feedback force to the pilot user interface about the second rotational axis;
    a first pilot user interface motor control coupled to receive the first pilot user interface force signal and the first pilot user interface position signal and operable to selectively control motor current to the first pilot user interface motor based on either (i) the first pilot user interface force signal or (ii) the first pilot user interface position signal; and
    a second pilot user interface motor control coupled to receive the second pilot user interface force signal and the second pilot user interface position signal and operable to selectively control motor current to the second pilot user interface motor based on either (i) the second pilot user interface force signal or (ii) the second pilot user interface position signal.

2. The system of claim 1, wherein for each of the first pilot and second pilot user interface motor controls the pilot user interface motor control selectively controls motor current to the pilot user interface motor based on:
    the pilot user interface force signal at least when the pilot user interface position signal is not received by the pilot user interface motor control; and
    the pilot user interface position signal at least when the pilot user interface force signal is not received by the pilot user interface motor control.

3. The system of claim 1, wherein the second pilotuser interface motor control selectively controls motor current to the second pilot user interface motor based on:
    the second pilot user interface force signal at least when the second pilot user interface position signal is not received by the second pilot user interface motor control; and
    the second pilot user interface position signal at least when the second pilot user interface force signal is not received by the second pilot user interface motor control.

4. The system of claim 1, further comprising:
    a co-pilot user interface configured to receive an input force and, upon receipt of the input force, to move to a position;
    a co-pilot user interface force sensor configured to sense the input force supplied to the co-pilot user interface and operable to supply a co-pilot user interface force signal representative thereof; and
    a co-pilot user interface position sensor operable to supply a co-pilot user interface position signal representative of co-pilot user interface position.

5. The system of claim 4, wherein the pilot user interface motor control is further coupled to receive the co-pilot user interface force signal and the co-pilot user interface position signal and is further operable to selectively control motor current to the pilot user interface motor based on either (i) the co-pilot user interface force signal or (ii) the co-pilot user interface position signal.

6. The system of claim 5, wherein the pilot user interface motor control further selectively controls motor current to the pilot user interface motor based on:
    the co-pilot user interface force signal at least when the co-pilot user interface position signal is not received by the pilot user interface motor control; and
    the co-pilot user interface position signal at least when the co-pilot user interface force signal is not received by the pilot user interface motor control.

7. The system of claim 4, further comprising:
    a co-pilot user interface motor coupled to the co-pilot user interface user interface, the co-pilot user interface motor further coupled to receive motor current and operable, upon receipt thereof, to supply a co-pilot user interface feedback force to the co-pilot user interface user interface; and
    a co-pilot user interface motor control coupled to receive the co-pilot user interface force signal and the co-pilot user interface position signal and operable to selectively control motor current to the co-pilot user interface motor based on either (i) the co-pilot user interface force signal or (ii) the co-pilot user interface position signal.

8. The system of claim 7, wherein the co-pilot user interface motor control selectively controls motor current to the co-pilot user interface motor based on:
the co-pilot user interface force signal at least when the co-pilot user interface position signal is not received by the co-pilot user interface motor control; and
the co-pilot user interface position signal at least when the co-pilot user interface force signal is not received by the co-pilot user interface motor control.

9. The system of claim 8, wherein:
the co-pilot user interface motor control is further coupled to receive the pilot user interface force signal and the pilot user interface position signal and is further operable to selectively control motor current to the co-pilot user interface motor based on either (i) the pilot user interface force signal or (ii) the pilot user interface position signal.

10. The system of claim 9, wherein the co-pilot user interface motor control further selectively controls motor current to the co-pilot user interface motor based on:
the pilot user interface force signal at least when the pilot user interface position signal is not received by the co-pilot user interface motor control; and
the pilot user interface position signal at least when the pilot user interface force signal is not received by the co-pilot user interface motor control.

11. The system of claim 8, wherein:
the co-pilot user interface is configured to rotate, from a null position, about a first rotational axis and about a second rotational axis, the second rotational axis perpendicular to the first rotational axis; and
the co-pilot user interface is responsive to the supplied input force, to rotate, from the null position to the control position, about one or both of the first and second rotational axes.

12. The system of claim 11, wherein:
the co-pilot user interface force sensor is configured to sense a vector component of the input force supplied to the co-pilot user interface that results in co-pilot user interface rotation about the first rotational axis;
the co-pilot user interface position operable to supply a co-pilot user interface position signal representative of a vector component of the control position that lies along the second rotational axis; and
the co-pilot user interface motor is configured, upon receipt of motor current, to supply the co-pilot user interface feedback force to the co-pilot user interface about the first rotational axis.

13. The system of claim 12, further comprising:
a second co-pilot user interface force sensor configured to sense a vector component of the input force supplied to the co-pilot user interface that results in co-pilot user interface rotation about the second rotational axis and operable to supply a second co-pilot user interface force signal representative thereof;
a second co-pilot user interface position sensor operable to supply a second co-pilot user interface position signal representative of a vector component of the control position that lies along the first rotational axis;
a second co-pilot user interface motor coupled to the co-pilot user interface, the second co-pilot user interface motor further coupled to receive motor current and operable, upon receipt thereof, to supply a second co-pilot user interface feedback force to the co-pilot user interface about the second rotational axis; and
a second co-pilot user interface motor control coupled to receive the second co-pilot user interface force signal and the second co-pilot user interface position signal and operable, upon receipt of at least these signals, to selectively control motor current to the co-pilot user interface motor based on either (i) the second co-pilot user interface force signal or (ii) the second co-pilot user interface position signal.

14. The system of claim 13, wherein the second co-pilot user interface motor control selectively controls motor current to the second co-pilot user interface motor based on:
the second co-pilot user interface force signal at least when the second co-pilot user interface position signal is not received by the second co-pilot user interface motor control; and
the second co-pilot user interface position signal at least when the second co-pilot user interface force signal is not received by the second co-pilot user interface motor control.

15. An active user interface control system, comprising:
a pilot user interface configured to receive an input force and, upon receipt thereof, to move to a pilot user interface control position;
a co-pilot interface configured to receive an input force and, upon receipt thereof, to move to a co-pilot user interface control position;
a pilot user interface force sensor configured to sense the input force supplied to the pilot user interface and operable to supply a pilot user interface force signal representative thereof;
a co-pilot user interface force sensor configured to sense the input force supplied to the co-pilot user interface and operable to supply a co-pilot user interface force signal representative thereof;
a pilot user interface position sensor operable to supply a pilot user interface position signal representative of pilot user interface position;
a co-pilot user interface position sensor operable to supply a co-pilot user interface position signal representative thereof co-pilot user interface position;
a pilot user interface motor coupled to the pilot user interface, the pilot user interface motor further coupled to receive motor current and operable, upon receipt thereof, to supply a pilot user interface feedback force to the pilot user interface;
a co-pilot user interface motor coupled to the co-pilot user interface, the co-pilot user interface motor further coupled to receive motor current and operable, upon receipt thereof, to supply a co-pilot user interface feedback force to the co-pilot user interface;
a pilot user interface motor control coupled to receive the pilot user interface and co-pilot user interface force signals and the pilot user interface and co-pilot user interface position signals and operable to selectively control motor current to the pilot user interface motor based on one of:
(i) at least the pilot user interface force signal and the co-pilot user interface force signal,
(ii) the pilot user interface force signal and the co-pilot user interface position signal,
(iii) the pilot user interface position signal and the co-pilot user interface force signal, or
(iv) the pilot user interface position signal and the co-pilot user interface position signal; and
a co-pilot user interface motor control coupled to receive the pilot user interface and co-pilot user interface force signals and the pilot user interface and co-pilot user interface position signals and operable to selectively control motor current to the co-pilot user interface motor based on one of:
(i) the pilot user interface force signal and the co-pilot user interface force signal,
(ii) the co-pilot user interface force signal and the pilot user interface position signal,
(iii) the co-pilot user interface position signal and the pilot user interface force signal, or
(iv) the co-pilot user interface position signal and the pilot user interface position signal.

16. An active user interface control system, comprising:
a pilot user interface configured to receive an input force and, upon receipt of the input force, to move to a control position;
a co-pilot user interface configured to receive an input force and, upon receipt of the input force, to move to a position;
a pilot user interface force sensor configured to sense the input force supplied to the pilot user interface and operable to supply a pilot user interface force signal representative thereof;
a co-pilot user interface force sensor configured to sense the input force supplied to the co-pilot user interface and operable to supply a co-pilot user interface force signal representative thereof;
a pilot user interface position sensor operable to supply a pilot user interface position signal representative of pilot user interface position;
a co-pilot user interface position sensor operable to supply a co-pilot user interface position signal representative of co-pilot user interface position;
a pilot user interface motor coupled to the pilot user interface, the pilot user interface motor further coupled to receive motor current and operable, upon receipt of the motor current, to supply a pilot user interface feedback force to the pilot user interface; and
a pilot user interface motor control coupled to receive the pilot user interface force signal, the co-pilot user interface force signal, the pilot user interface position signal, and the co-pilot user interface position signal, the pilot user interface motor control operable to selectively control motor current to the pilot user interface motor based on either (i) the pilot user interface force signal or (ii) the pilot user interface position signal, and further based on either (i) the co-pilot user interface force signal or (ii) the co-pilot user interface position signal.

* * * * *